COLOR TELEVISION SYSTEM

Filed Dec. 5, 1946 2 Sheets-Sheet 1

INVENTOR
GORDON L. FREDENDALL
BY H. S. Grover.
ATTORNEY

COLOR TELEVISION SYSTEM

Filed Dec. 5, 1946 2 Sheets-Sheet 2

INVENTOR
GORDON L. FREDENDALL
BY H. S. Grover
ATTORNEY

Patented June 27, 1950 2,513,159

UNITED STATES PATENT OFFICE 2,513,159

COLOR TELEVISION SYSTEM

Gordon L. Fredendall, Feasterville, Pa., assignor to Radio Corporation of America, a corporation of Delaware Application December 5, 1946, Serial No. 714,266

1 Claim. (Cl. 178—5.4)

My invention relates in general to the art of television transmission and more particularly to the art of transmitting televised images in color.

In the sequential type of transmission, a single image pick-up or camera apparatus is utilized with a set of component color filters arranged in a rotatable member and interposed between the image and the camera in a selected sequence. The signal representations of each component color field thus are developed sequentially and likewise are transmitted sequentially. Such a system is shown, for instance, in the U. S. patent application of Otto H. Schade, Serial No. 444,651, filed May 27, 1942, now Patent No. 2,413,075, granted December 24, 1946, and entitled "Method and System for Developing Television Signals." The arrangement, which in practice generally is used, comprises a single camera with a rotating disc or drum passing the color filter between the image and the camera in a chosen sequence.

In the second system of color transmission, i. e., the simultaneous type, the optical image to be televised is, by appropriate optical means, directed simultaneously to several individual image pick-up or camera devices and, in contradistinction to the sequential type of image scansion color system, signals representative of the optical values of one of the selected component colors into which the image being televised is analyzed are developed by each of the cameras. All of the signal developments in each of the component colors take place simultaneously. Transmission of the signal representations of each elemental area of the scanned image in each of the selected component colors also is done simultaneously. Accordingly, a system of this character is referred to as the simultaneous type of color television transmission. Such a system is illustrated in one representative form, for instance, in the article in "Electronic Industries" for December 1946 at page 58 et seq.

The simultaneous system of transmission has distinct advantages over that of the sequential system, particularly at the present time. In the first place, the receiver which reconstructs the signals, reconstructs the image in all of the component colors simultaneously, and to some degree, therefore, a better balance between the reconstructed colors is obtained.

The second, and major advantage, is the fact that one of the transmitted signals, and usually it is the signal representative of the green component color of the image, may be received and reproduced by a monochromatic or black and white type of reproducer. Accordingly, the audience which may be served by the transmission is greatly enlarged. The advantages attendant this fact are obvious. There is no necessity for deriving multiple transmissions of differing standards of any scene being televised and, further, there is no need for additional transmitters to transmit black and white representations of the scene as well as the color representations. In addition, black and white receivers already on the market can, with the aid of simple adapter apparatus to enable them to tune to the frequency of the carrier representing one of the component colors of the image, be extended for use with color transmission. Obsolescence of this type of receiver in the hands of the purchasing public thus is minimized and the use of receivers purchased for black and white reception is extended. It thus becomes one of the objects of my invention to provide an improved color television transmitter of the simultaneous transmission type.

It has been pointed out by Alfred C. Schroeder in his U. S. patent application, Serial No. 706,613, filed October 30, 1946, that an economy of the frequency spectrum utilized in a simultaneous type of color television transmission may be accomplished by deleting or filtering out some of the higher frequency signal components of at least one of the component colors of the image. Further work along this line suggests the possibility that the widths of the video channels for each of the green and red component colors may, if desired, be made approximately equal but that the blue video channel need be only about one-third as wide as the green and red channels. The transmitter arrangement in accordance with this invention is particularly adaptable for use with the type of transmission set forth in the above-mentioned Schroeder application or with the channel width further modified as immediately above mentioned. Thus, it is a further object of this invention to provide a transmitting system which may be used for this purpose.

In the Schroeder application hereinbefore referred to an exemplary showing is made wherein the carrier of lowest frequency is modulated by the signals representative of the green component color of the image being televised and the lower frequency side band so formed is partially suppressed. The next highest carrier in frequency is modulated by the red component color signals and the lower frequency side band partially suppressed. This places the vestigial side band of the red component color adjacent the unsuppressed or major side band of the green component color and spaced apart slightly from it. Also in the exemplary arrangement of the Schroeder application the signals representative of the blue component color modulate the highest frequency carrier and the partially suppressed side band of the blue is arranged adjacent the major side band of the red component color. In the arrangement in accordance with my invention I prefer to interpose the blue or lowest color detail band between the green and the red bands and my system is adaptable for the selected arrangement of any of the transmitted bands relatively to each other. The advantage of this is that the arrangement as set forth in this application provides a flexibility that is very desirable since it allows the changing of the arrangement of the component color signals relatively to each other by merely changing the connections to the subcarrier generators and also easily allows the changing of the frequencies used by merely altering the frequencies of the subcarrier generators. Of course, some alteration in the filters used in the circuits would have to be made under these circumstances but this is believed to be clear from general understanding of the art. Accordingly, the present system allows a flexibility of operation which is highly desirable.

The problem of transmitting three simultaneous color television signals is essentially a problem in multiplex transmission by frequency division. This may be accomplished by transmitting three separate carrier frequencies, each modulated by one of the component colors of the image being televised and, if so, effectively three separate transmitters are required.

With the present arrangement, however, it is not necessary to provide three separate transmitters with their attendant modulators and controlled oscillators, but in the arrangement set forth in this invention effectively there is formed a combined signal representative of all three of the component colors of the image being televised and which modulates a single controlled transmitter. In addition, spacing between the bands representing the different component colors is accomplished automatically and, therefore, it is another of the objects of my invention to provide an apparatus which has these features.

Additionally, where three separate transmitters are used, signals from the pick-up apparatus to each of the transmitters must be fed over a separate communication channel to the transmitter. On the other hand, with the arrangement in accordance with the present invention, all of the signals representative of the component colors of the image may be conducted over a single radio or wire link, such as a coaxial cable, to the transmitter which is being used. Therefore, it is a further object of this invention to provide a transmission system in which this may be accomplished.

Other objects of my invention will be apparent from a reading of the hereinafter appended specification.

My invention in general contemplates the provision of three cameras each of which develops signals representative of one of the component colors of the image being televised. A single transmitter is provided to generate a basic or fundamental carrier frequency and the signals from one of the cameras may be used to directly modulate this fundamental frequency. The other two cameras each feed their signals into a modulator which is supplied in each instance with a subcarrier developed by a subcarrier generator, the frequency of the subcarrier being chosen in each case so as to space apart in the frequency spectrum the signals developed by each camera by a desired frequency range. These subcarriers are then fed through appropriate filters in order to partially suppress one of the side bands formed during the modulation thereof, and the outputs of the filters are fed to the transmitter generating the fundamental frequency wave where they also modulate the fundamental frequency. Further filters are provided to suppress some of the side bands formed during modulation of the fundamental frequency. Spacing apart, then, of the representations of the three component colors of the image being televised is accomplished automatically and this frequency spacing will be maintained despite changes in the frequency of the fundamental wave. Monochromatic receivers tune to the frequency of one of the component colors, usually the green.

My invention will be understood best by a reference to the drawings in which.

Figure 1:
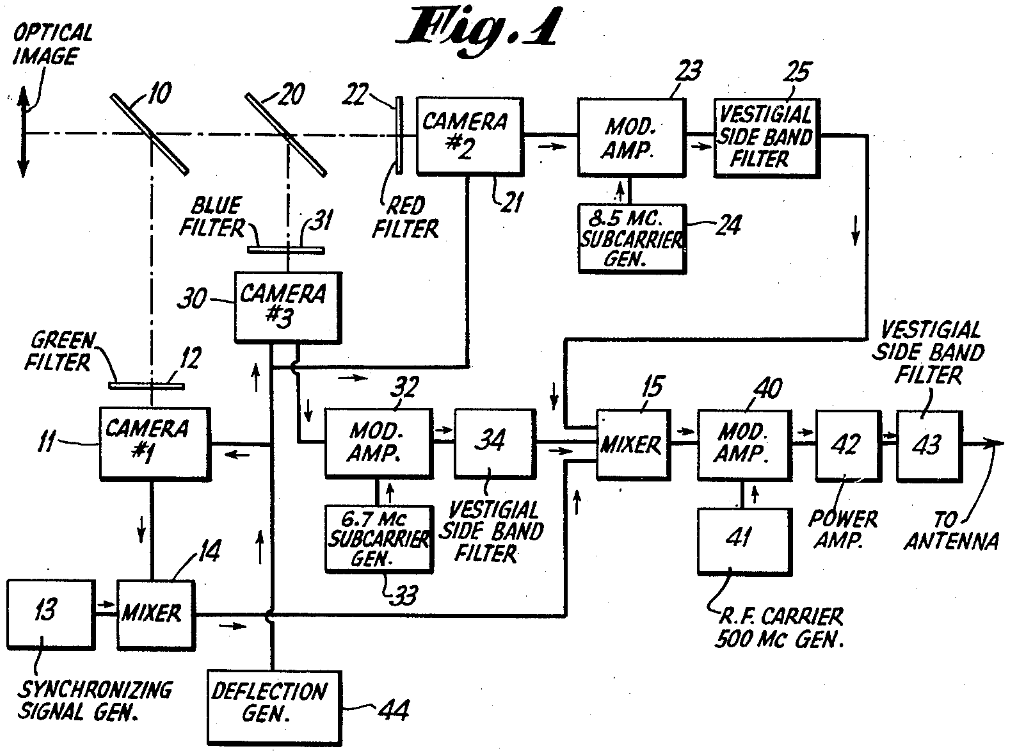
Fig. 1 is a schematic block diagram representation of a transmission system in accordance with this invention.

Referring to Fig. 1, there is shown a schematic block diagram representation of a transmitter for simultaneous color television transmission in accordance with my invention. In the figure, an optical image (so labeled) to be televised in color and to have the additive component colors thereof derived and transmitted has the light rays representative thereof directed along a path to a partially transparent reflecting member or dichroic mirror 10. Color filters of the dichroic type which may be used for the component color selection have been described by G. L. Dimmick in the "Journal of the Society of Motion Picture Engineers," vol. 38, January, 1942, at pages 36 to 44 in an article entitled "A New Dichroic Reflector and its Application to Photocell Monitoring Systems." Thus, reference may be made to the publication for further description.

The light rays representative of the image then form two individual and complete image representations, one of which passes through the member 10 and the other of which is reflected from this element. The image representation that is reflected from the mirror 10 is directed along a path to a first television camera 11. Interposed between the mirror 10 and the camera 11 is a component color filter 12 which, in this instance, may be assumed to be the green filter, or, in other words, a filter which will allow only the green components of the image to pass therethrough for scansion by the television camera which has been schematically represented. The television camera may embody any suitable form of television camera tube to convert the optical image into trains of electrical signal impulses under scanning operations. Suitable camera tubes include, for instance, the iconoscope, the orthicon and the image orthicon, all of which are well known. The control circuits by which the scanning operation is brought about are indicated only schematically since they are well known in the art.

Signals from the synchronizing generator 13 are brought in to a mixer 14 where they are combined with the video signals derived by camera 11 and so form a composite signal. Synchronizing signal generators are well known per se and will not be described extensively here. Such generators, for instance, are illustrated in the U. S. patent application of Earl Schoenfeld, Serial No. 682,738, filed July 11, 1946, and entitled "Timer and Synchronizing Signal Generator," as well as U. S. Patent 2,258,943, granted to A. V. Bedford on October 14, 1941, as an example.

The output of the mixer 14 is then fed to another mixer 15. This mixer, if desired, can comprise what is a well known form of mixing arrangement in which the signals to be mixed with each other are impressed onto separate control grids of a multigrid thermionic tube. In actual practice, this could be a pentode type of tube using the suppressor grid as one of the control grids, or, in practice, it has been a 6L7 type of tube. These mixers are so well known per se and of themselves do not comprise the invention, that no extended explanation is necessary at this point.

The light rays of the optical image which pass through the mirror 10 then are directed along an optical path to a second partially transparent reflecting member or dichroic mirror 20 and again will form two complete optical image representations, one of which will pass through the element 20 and the other of which will be reflected therefrom.

The optical image representation which passes through the mirror 20 is then directed along another optical path in such a way that it impinges on the scansion tube of a second camera 21. Interposed between the mirror 20 and camera 21 is a color filter 22 whose purpose is to allow the passage therethrough of the red component color (as by the illustrated example) of the optical image being scanned. The signal output of camera 21 therefore will be signal representations of the optical values of the red component color in the image undergoing scansion.

These output signals are fed to a modulator-amplifier 23 which will be described in more detail hereinafter with reference to Fig. 2. The modulator-amplifier 23 has fed to it signals from a subcarrier generator 24 which, in this instance, has been illustrated as being a subcarrier generator having a frequency output of 8.5 megacycles. It will be appreciated that this is purely by way of example and that these frequencies need not be strictly adhered to. Signal outputs from the camera 21 will then modulate the 8.5 mc. subcarrier frequency to form a signal of 8.5 mc. with upper and lower side bands. One of the side bands may be partially suppressed and for this purpose the signal is passed through the vestigial side band filter 25. This type of filter is generally well known but also will be shown more in detail hereinafter with respect to Fig. 2. The output of filter 25 is then fed to the mixer 15.

The optical image representation which is reflected from mirror 20 is directed along an optical path to a third camera 30 where it is scanned. Interposed between mirror 20 and camera 30 is a color filter member 31 which, in this instance, will be the blue filter, i. e., it will allow the passage therethrough of only the blue component of the image undergoing televising. The output of camera 30 is fed to a modulator-amplifier 32, the latter having supplied thereto a subcarrier frequency generated by subcarrier generator 33. This generator is illustrated, by way of example only, as having a frequency output of 6.7 mc.

The output of the modulator-amplifier 32 will be a wave of 6.7 mc. frequency with upper and lower side bands formed by the video signal. One of the side bands is partially suppressed to form a vestigial side band by means of the side band filter 34 and the output of filter 34 will be a wave of 6.7 mc. frequency with a complete side band and a vestigial side band. The output of filter 34 is also passed to the mixer 15.

All three signals will appear in the output of the mixer 15 which, as indicated hereinbefore, may be a multigrid type of tube having each of the signals to be mixed impressed onto separate grids thereof, one of these signals being the composite signal representing the green color components of the image and the synchronizing signals, the second signal being a signal representing the red component of the image appearing as a modulation of the 8.5 mc. subcarrier with a main and a vestigial side band, and the third signal will be a signal being that representing the blue component of the image being televised and appearing as a modulation of the 6.7 mc. subcarrier and having a main and a vestigial side band.

Figure 2:
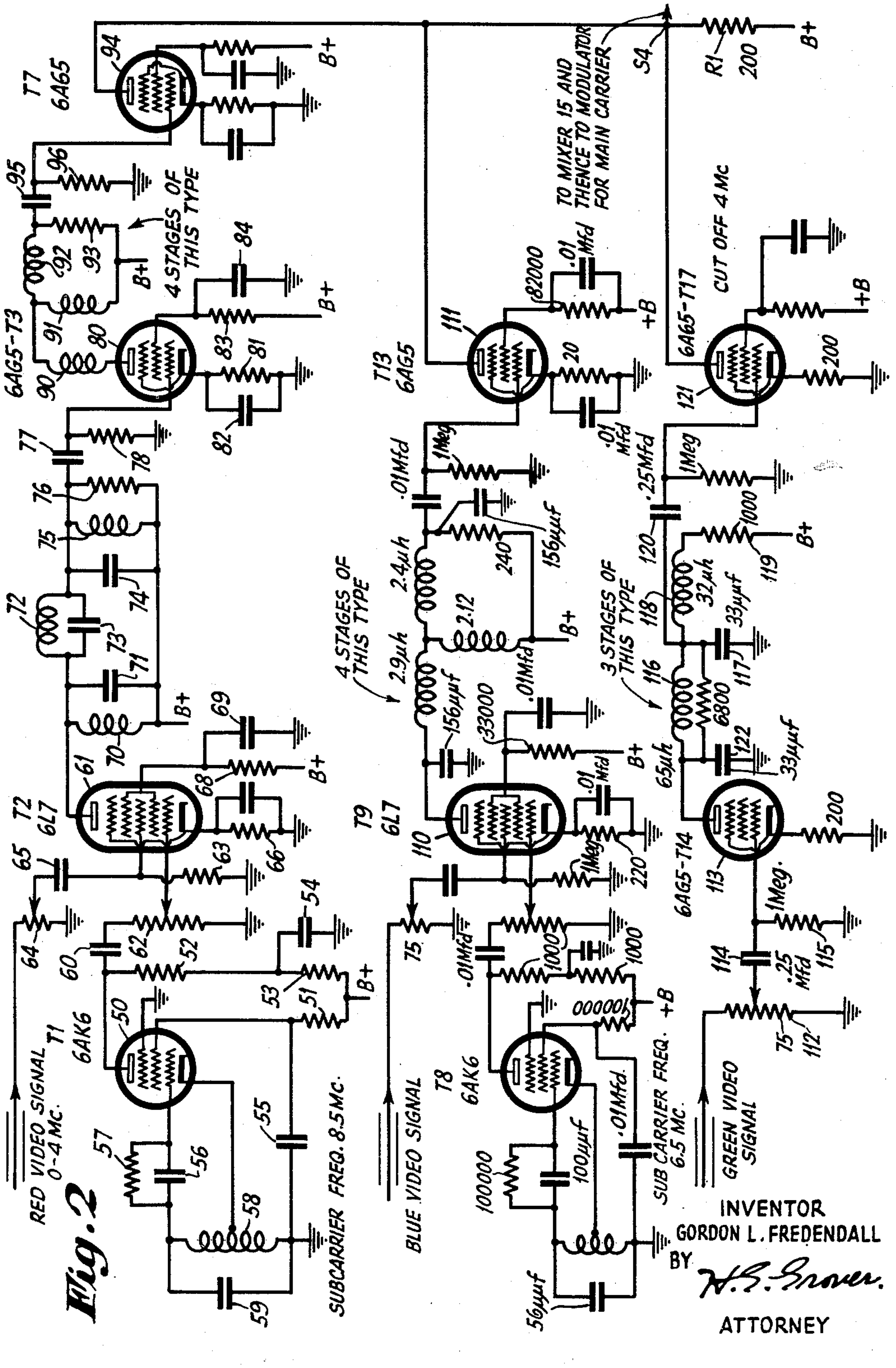
Fig. 2 is a schematic circuit drawing of the transmitter up to the main modulator stage; and, Fig. 3 is an explanatory curve.

These separate signals are passed simultaneously to modulator-amplifier unit 40 which will not be explained in further detail since it is generally similar to the modulator-amplifier unit 23 which will be shown in detail in Fig. 2. There is provided a generator 41 for developing the main carrier output or fundamental wave. This high frequency generator may be of any desired and known type or form and this will not be described in detail. The generated main carrier frequency is supplied to the modulator-amplifier 40 where it is modulated by the three signals appearing as the output from the mixer 15. The output of the element 40 is then customarily impressed onto a power amplifier 42. The output of the power amplifier, in turn, is supplied to the vestigial side band filter 43 since the output of the modulator-amplifier 40 will have both upper and lower side bands and it is not desired to transmit both of these side bands completely.

The output of filter 43 may be fed to an antenna for radiation or may be transmitted by other well known transmission means, as, for instance, coaxial cables, and it should be understood that by transmission is meant any of the known forms of transmitting which may be utilized in carrying the signals from the transmitter to a utilizing apparatus. Side band filter 43 will not be described in detail since it is similar to side band filter 25 and this will be explained in detail in Fig. 2. This filter may be made up in accordance with the teachings of the book entitled "Transmission Networks and Wave Filters," by T. E. Shea, published by D. Van Nostrand, 1929 edition. Also, filters of this type have been in use in television transmission systems in the United States for some time and one form thereof is shown and explained in the text "Television Engineering" (see page 289, for example), by D. G. Fink, published by McGraw-Hill Book Company, Inc.

Deflection potentials for all three of the cameras may be furnished by suitable line and field control deflection generators, collectively indicated as the element 44. Since such units are well known, they will not be described in detail here. In general these generators will comprise sawtooth wave generators, one of whose outputs will be at field frequency and the other of whose outputs will be at line frequency.

Referring to Fig. 2, there is shown a schematic circuit diagram illustrating a portion of the circuits indicated by the block diagram of Fig. 1. Since the manner of derivation of the component color signals by the use of a multiple number of cameras with associated color filters and a plurality of partially transparent reflecting members has been clearly illustrated in Fig. 1, there is no necessity of repeating the illustration in this figure.

The 8.5 mc. subcarrier generator comprises a vacuum tube 50 (of which a type 6AK6 tube is suitable) having the plate and screen grid connected to a source of positive potential (not shown) indicated by B+ and the screen grid is connected to this potential source through resistor 51. The plate is connected to the source of potential through serially connected resistors 52 and 53. The common terminal of the latter two resistors is a. c. grounded through condenser 54. The screen grid is grounded through condenser 55. The control grid is connected through a condenser grid lead combination 56, 57 to one terminal of an inductance 58 to which the cathode of the tube is connected by a tap. The inductance is shunted by a condenser 59 and the terminal of the tuned circuit comprising inductance 58 and condenser 59 which is remote from the condenser grid leak combination is grounded. Proper choosing of the parameters of this circuit will produce a subcarrier frequency of 8.5 mc.

The output of tube 50, which is derived by electron coupling to the plate of the tube, is supplied then through condenser 60 to the input circuit of an amplifier-modulator tube 61, one of the control grids of the latter tube being adjustably connected to a point on a resistor 62 for level control purposes, one terminal of which is connected to the condenser 60 and the other terminal of which is grounded.

A second control grid of tube 61 is connected to one terminal of a resistor 63, the other terminal of which is grounded. The common connection of this control grid and resistor is connected to a potentiometer 64 through a coupling condenser 65. Signals from camera 21 (which will be assumed to be the "red" signal channel) are impressed on the potentiometer. The cathode of tube 61 is connected to ground through a resistor 66 shunted by a condenser 67. The screen grid of the tube is connected to B+ through resistor 68 and is a. c. grounded through condenser 69. The result will be that the output signal from tube 61 will be a subcarrier of 8.5 mc. which has been modulated by the video signals representing the red component color of the image being televised.

The signal output of tube 61 then passes to a succession of circuits (including tubes 80 and 94 and their circuit components) which have been indicated schematically in Fig. 1 as the vestigial side band filter 25. The plate of the tube 61 is connected to +B through peaking inductance 70 which is shunted by condenser 71. Serially connected with the inductance 70 is the combination of an inductance 72 and condenser 73 connected in shunt. Serially connected with inductance 70 and the tuned circuit 72, 73 is a condenser 74 which is shunted by inductance 75 and a resistance 76. Also connected serially with inductance 70 and the tuned circuit 72, 73 is coupling condenser 77 and input resistor 78, the latter being grounded at its uncommon terminal. The common terminal of condenser 77 and resistor 78 is connected to a control grid of a further amplifying stage, of which a 6AG5 type of tube 80 has been found suitable. The cathode of tube 80 is grounded through resistor 81, the resistor being shunted by condenser 82. The screen grid of tube 80 is connected to B+ through resistor 83 and is a. c. grounded through condenser 84.

Figure 3:
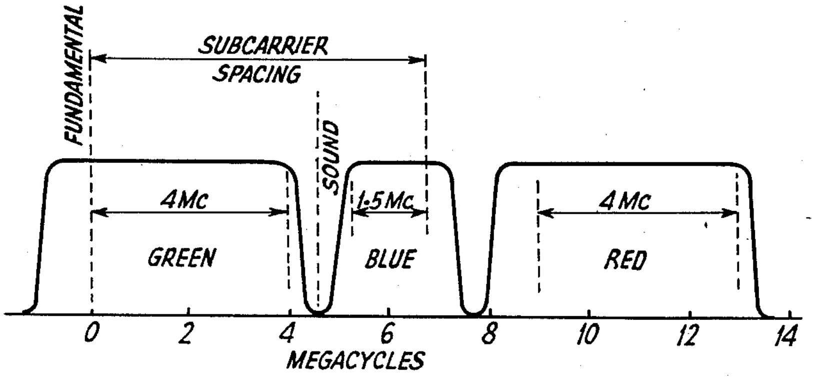

The plate of tube 80 is connected to B+ through serially connected inductances 90 and 91. Inductance 91 is shunted by a series circuit comprising inductance 92 and resistor 93. The common terminal of inductance 92 and resistor 93 is coupled to a control grid of a further amplifying stage, such as a 6AG5 type of tube, 94 through a coupling condenser 95. The tube grid is grounded through resistance 96. The output of the tube 94 is connected to one end of a resistor 100. As indicated in the drawing, there are four stages (although more or less may be used as seen fit) of the type shown by the circuits of tube 80 feeding into the tube 94, but for purposes of simplicity these have not been illustrated. The potential drop across resistor 100 will include, among other signals, the 8.5 mc. subcarrier with one vestigial side band of the general shape illustrated hereinafter in Fig. 3 and marked "red."

The apparatus and circuit for treating the so-called blue video signal is very similar to that for utilizing the red video signal and, accordingly, will not be explained in detail. An oscillator of the type illustrated in conjunction with the red video signal and also comprising, for instance, a 6AK6 type of tube feeds into a modulator-amplifier tube such as, for example, a 6L7 type of tube, which has supplied to one grid or control electrode thereof the blue component video signal. The output of the tube 110 is passed through a succession of filter stages (assumed as four in number for illustration) such as comprised the filter utilized with the red component signal but having different parameters and including inductances 90, 91 and 92. The last stage comprises a further amplifier, such as a 6AG5 type of tube, 111 whose plate is connected to the resistor 100 to furnish current therethrough.

The green video signal and the synchronizing signals which accompany it after being combined in the mixer 12 are impressed across potentiometer 112 by which selected amounts of the signal are impressed onto a control grid of a vacuum tube 113 through coupling condenser 114. The grid is grounded through resistor 115. The output of tube 113 feeds into a low pass filter comprising inductances 116 and 118 with shunt condensers 117 and 122, inductance 118 being connected through resistor 119 to a source of positive potential indicated by B+. A selected output from this filter arrangement then may be impressed through condenser 120 onto the input circuit of tube 121, the latter being an amplifying arrangement which, in actual practice, has been a 6AG5 type of tube. The low pass filter circuit, of which one stage has been shown for purposes of simplicity, is arranged to cut off at approximately 4 mc. The plate of tube 121 is also connected to resistor 100 and, accordingly, across resistor 100 there will be signals developed which are representative of the green component color and the synchronizing signals, the 6.5 mc. subcarrier modulated by the blue video component and having one side band partially suppressed, and the 8.5 mc. subcarrier frequency modulated by the red video signal and having one side band thereof partially suppressed. The shape and relative sizes of all three of these signals is shown diagrammatically in Fig. 3.

It will be appreciated that the bandwidth of these signals may be so chosen that there will be a selected frequency spacing between the green signal and the main side band of the blue and a spacing between the minor or vestigial side band of the blue and the vestigial side band of the red. The frequency separation or spacing between the green and the blue signal may be used to interpose a sound carrier channel, as was explained in the mentioned Schroeder application. In actual practice, the ratio of vestigial side band to transmitted side band width is subject to operational choice. Under one operating condition, the ratio was approximately .75 to 4.0.

The foregoing described components of Fig. 2 indicate the signal supply to the mixer amplifier 15 of Fig. 1. The remaining components shown by Fig. 1 need not be further detailed since all are well known types and the controlling factor in design is only that of providing for the somewhat wider signal bandwidth. With the described system, the total R.-F. channel required will be approximately 15 mc.

Values of resistances are in ohms and condensers in micromicrofarads unless otherwise indicated.

Having now described the invention, what is claimed and desired to be secured by Letters Patent is the following:

What I claim is:

A color television transmission system comprising in combination a camera means for deriving signal representations of one of the component colors of the image being televised, a source of sub-carrier frequency energy, means for modulating the sub-carrier frequency energy source in accordance with the values of the derived signal representations, a fundamental frequency source, modulating means for modulating the fundamental frequency source with the modulated sub-carrier frequency, and a vestigial side-band filter connected between said sub-carrier frequency modulating means and said fundamental frequency modulating means for suppressing only a fraction of the frequency range of one of the side bands of said modulated sub-carrier.

GORDON L. FREDENDALL.

REFERENCES CITED

The following references are of record in the file of this patent:

UNITED STATES PATENTS

| Number | Name | Date |
|---|---|---|
| 2,300,501 | Grundmann | Nov. 3, 1942 |
| 2,301,395 | Goldsmith | Nov. 10, 1942 |
| 2,335,180 | Goldsmith | Nov. 23, 1943 |
| 2,375,966 | Valensi | May 15, 1945 |
| 2,413,423 | Wilson | Dec. 31, 1946 |